United States Patent
Wright et al.

(10) Patent No.: US 12,370,999 B2
(45) Date of Patent: Jul. 29, 2025

(54) WHEEL DRIVING METHOD AND SYSTEM

(71) Applicant: Dana Automotive Systems Group, LLC, Maumee, OH (US)

(72) Inventors: Tim Wright, Maumee, OH (US); Brian Sitterly, Norwalk, OH (US); Thomas L. Nahrwold, Napolean, OH (US); Marcus Schmidt, Maumee, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 56 days.

(21) Appl. No.: 18/455,107

(22) Filed: Aug. 24, 2023

(65) Prior Publication Data
US 2025/0065860 A1   Feb. 27, 2025

(51) Int. Cl.
*B60W 10/20* (2006.01)
*B60W 50/10* (2012.01)
*B62D 15/02* (2006.01)

(52) U.S. Cl.
CPC ............ *B60W 10/20* (2013.01); *B60W 50/10* (2013.01); *B62D 15/021* (2013.01); *B60W 2510/202* (2013.01)

(58) Field of Classification Search
CPC ................. B60W 10/20; B60W 50/10; B60W 2510/202; B62D 15/021
USPC ......................................................... 701/41
See application file for complete search history.

(56) References Cited

U.S. PATENT DOCUMENTS

| | | | |
|---|---|---|---|
| 7,725,227 B2 | 5/2010 | Pattok et al. | |
| 7,974,754 B2 | 7/2011 | Nakatsu | |
| 8,589,030 B2 | 11/2013 | Lindenstruth | |
| 10,707,786 B2 | 7/2020 | Chaghajerdi et al. | |
| 2003/0111974 A1* | 6/2003 | Suzuki ................. | B62D 5/0463 318/661 |
| 2016/0107678 A1* | 4/2016 | Fischer ................ | B62D 5/0457 701/41 |
| 2019/0078512 A1 | 3/2019 | Duchene et al. | |
| 2019/0084616 A1* | 3/2019 | Bronikowski ..... | B60G 17/0162 |
| 2019/0389502 A1* | 12/2019 | Durot ........................ | B62D 1/20 |
| 2021/0394821 A1* | 12/2021 | Kakimoto .............. | B62D 15/02 |
| 2022/0144032 A1* | 5/2022 | Brooks .................. | B60G 11/04 |

FOREIGN PATENT DOCUMENTS

CN          101638052 B       1/2012

* cited by examiner

*Primary Examiner* — Yi-Kai Wang
(74) *Attorney, Agent, or Firm* — McCoy Russell LLP

(57) ABSTRACT

Methods and systems for operating a driveline that includes a cardan joint are described. In one example, electric machine torque is adjusted in response to driver demand torque and a torque to compensate for cardan joint rotation. The electric machine torque adjustments operate to cancel driveline torque variation that may be induced via the cardan joint.

18 Claims, 4 Drawing Sheets

WHEEL DRIVING METHOD AND SYSTEM

TECHNICAL FIELD

The present disclosure relates to a method and system for driving a wheel of a vehicle. The method may be applied via an electric machine to drive the wheel via a cardan joint.

BACKGROUND AND SUMMARY

A vehicle's wheels may move relative to the vehicle's chassis and relative to the vehicle's propulsion source. For example, rear wheels and front wheels may move in a vertical direction when the vehicle is traveling over a rough road. In addition, if the wheels are steering wheels (e.g., front wheels), the wheels may move vertically as well as about a pivot point. The vehicle may provide propulsive effort solely to front wheels, solely to rear wheels, or to both front and rear wheels. Consequently, a vehicle's driven wheel may move relative to the vehicle's propulsion source such that the rotational axis of the wheel may be inclined to the rotational axis of a shaft delivering power from the propulsion source to the driven wheel. As such, the shaft delivering power from the propulsion source may not be able to be directly coupled to the driven wheel. Rather, a cardan joint or a constant velocity joint may be installed between the shaft delivering power from the propulsion source and the driven wheel. The cardan joint and the constant velocity joint allow for motion between the shaft delivering power from the propulsion source and the driven wheel, but the constant velocity joint is financially more expensive than the cardan joint. On the other hand, the cardan joint does not provide constant and smooth torque transfer. Instead, the cardan joint may introduce oscillations in the torque that is transferred via the vehicle driveline. These oscillations may disturb passengers in the vehicle. Thus, it may be desirable to provide a way of smoothly transferring torque from a propulsion source to a wheel in a way that is financially inexpensive.

The inventors herein have recognized the above-mentioned issues and have developed a method for operating a driveline, comprising: adjusting a propulsion source torque command in response to a difference between an angle of the propulsion source and an angle of a wheel.

By adjusting torque output of a propulsion source, such as a motor, it may be possible to provide the technical result of smoother driveline rotation when a cardan joint is installed in a driveline upstream of a wheel and downstream of the propulsion source. In particular, torque generated via the propulsion source may counteract torque pulsations caused by speed changes in a cardan joint as the cardan joint rotates. As a result, a driveline with a cardan shaft may rotate smoother and have a lower possibility of disturbing occupants of a vehicle.

The present description may provide several advantages. In particular, the approach may lower a financial expense of a vehicle driveline. Further, the approach may provide smoother vehicle operation. In addition, the approach may increase customer satisfaction.

It is to be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
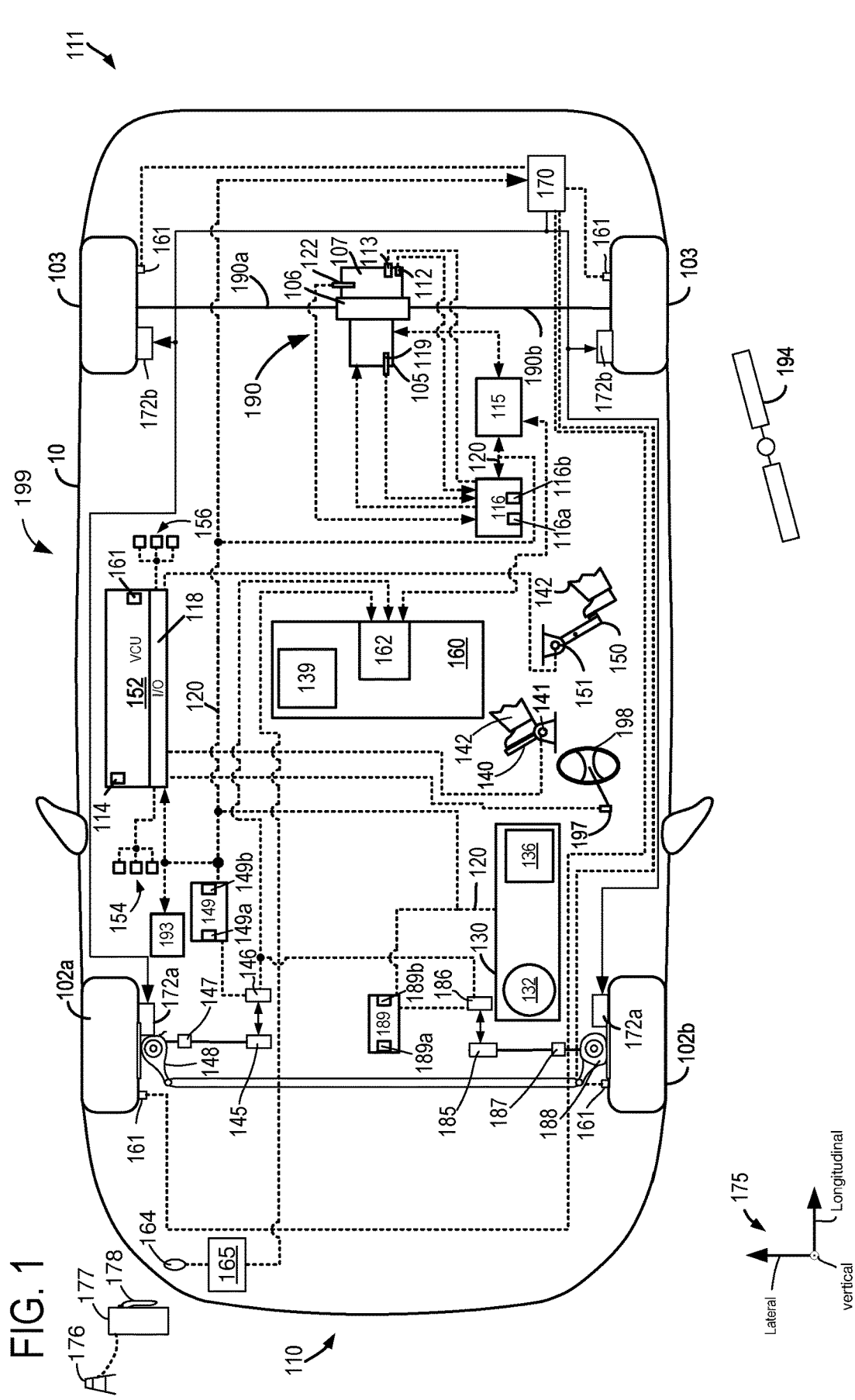
FIG. 1 is an illustration of an example vehicle that includes an electrified driveline.
Figure 2:
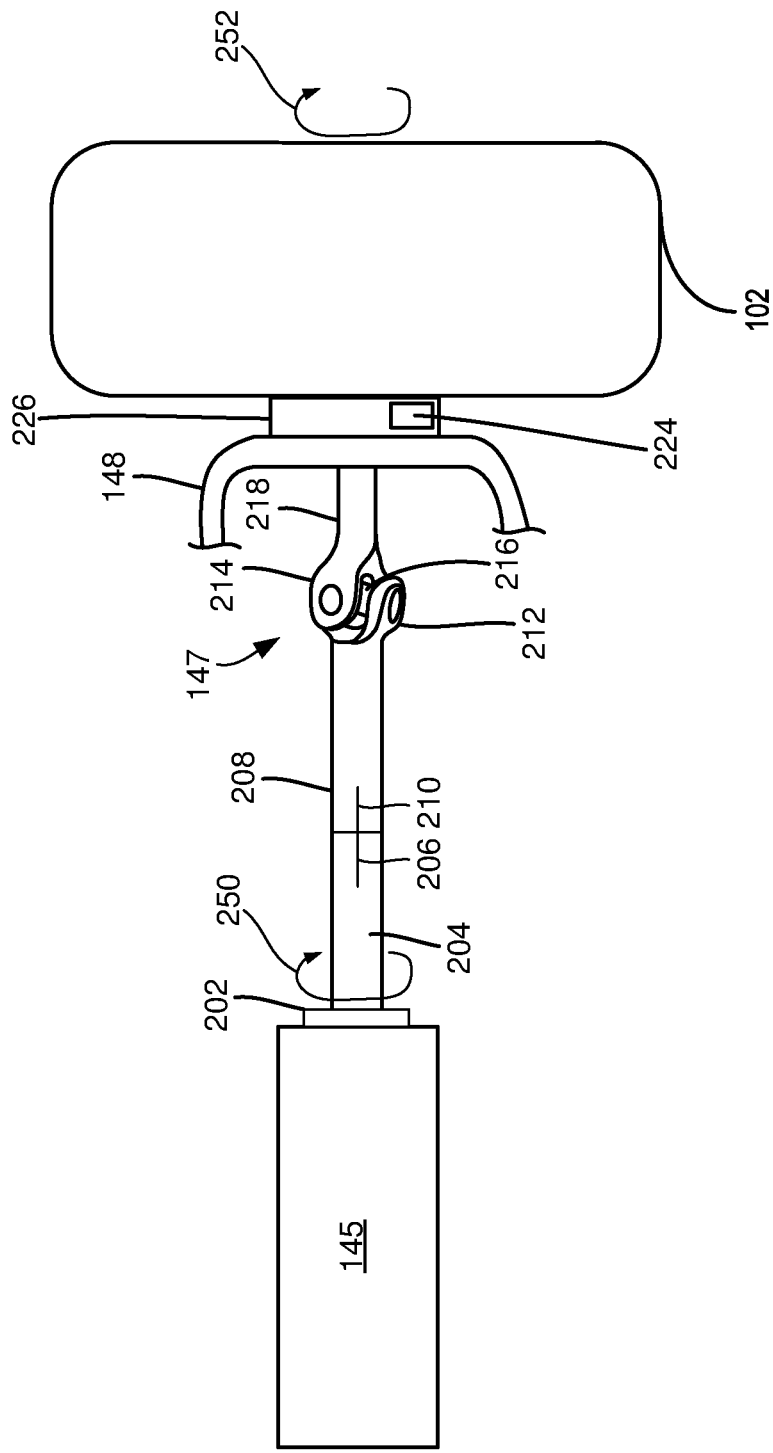
FIG. 2 shows a detailed view of a front right wheel driveline assembly.
Figure 3:
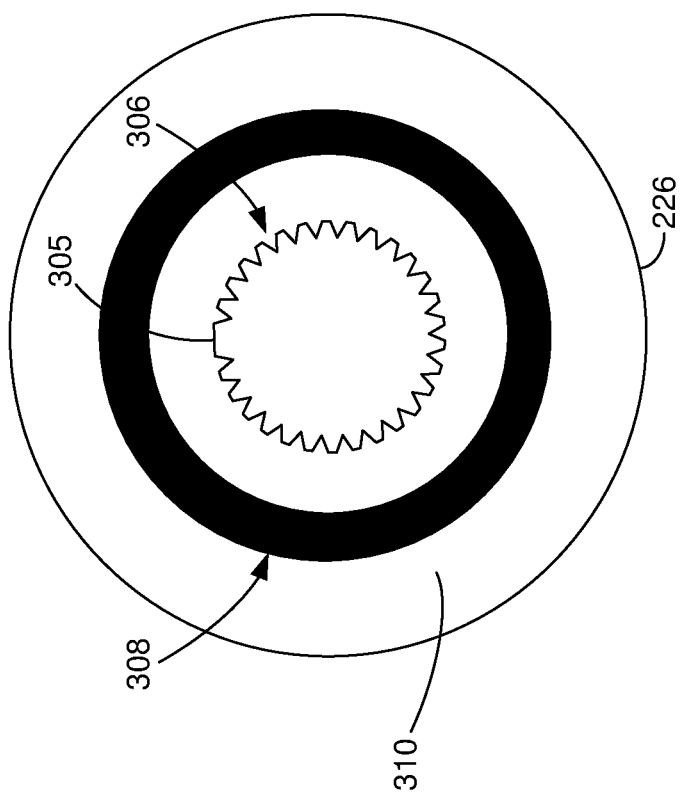
FIG. 3 shows an axial view of a driveshaft and a wheel hub.
Figure 3:
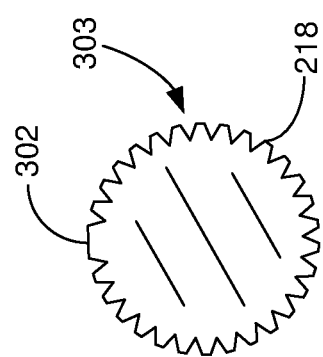
Figure 4:
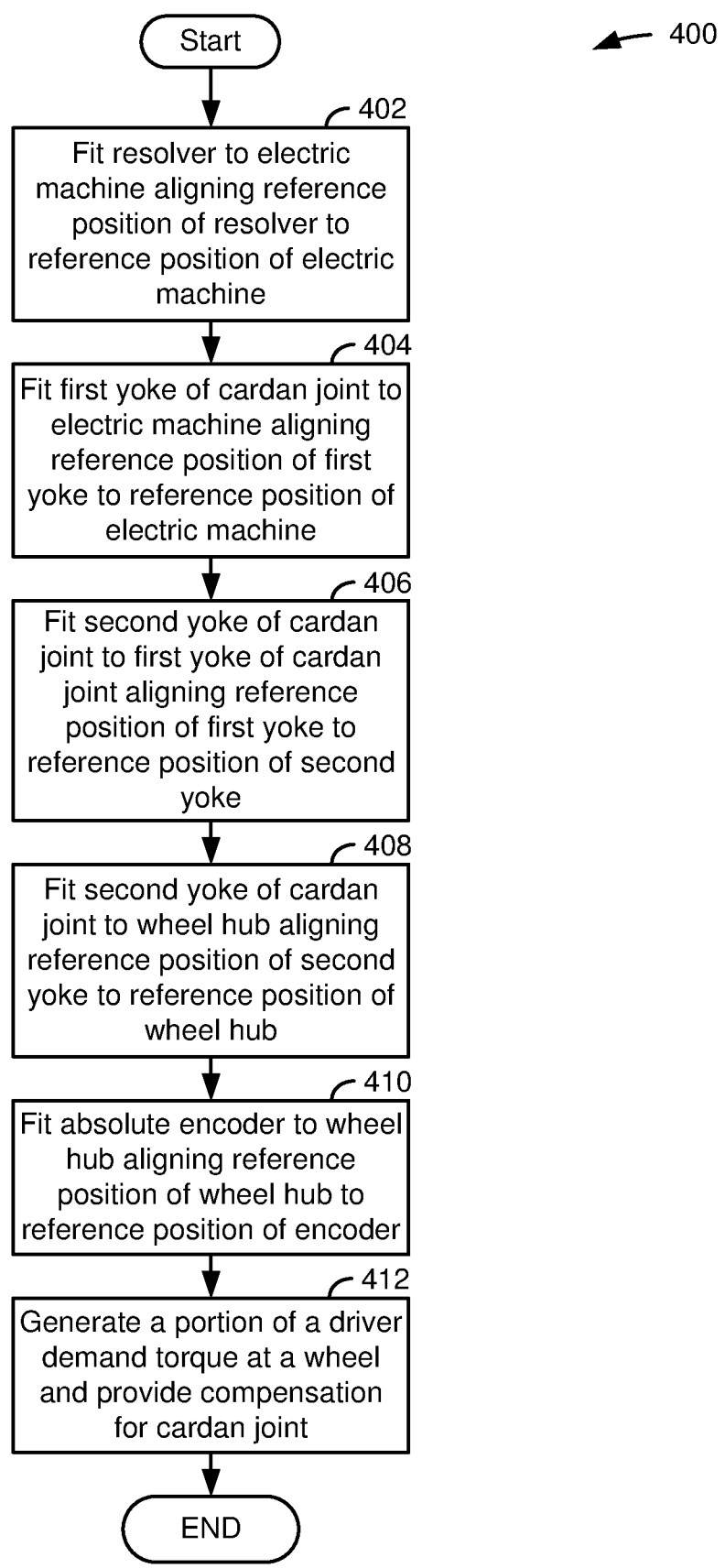
FIG. 4 shows a flow chart of a method for operating a driveline.

A method and system for operating a driveline that includes a cardan joint are described. In one example, a torque command for an electric machine is adjusted so that torque output of an electric machine compensates for torque variation of a driveline that may be related to cardan joint speed changes. The compensation may reduce torque fluctuations in the driveline such that torque may be delivered through the driveline smoothly. In one example, the system may be part of an electric vehicle as shown in FIG. 1. The system may include a cardan joint that is configured as shown in FIG. 2. The cardan joint may interface with a shaft and wheel hub as shown in FIG. 3. A flow chart of a method for operating a driveline is shown in FIG. 4.

FIG. 1 illustrates an example vehicle propulsion system 199 for vehicle 10. A front end 110 of vehicle 10 is indicated and a rear end 111 of vehicle 10 is also indicated. Vehicle 10 travels in a forward direction when front end leads movement of vehicle 10. Vehicle 10 travels in a reverse direction when rear end leads movement of vehicle 10. Vehicle propulsion system 199 is shown including propulsion source 105 (e.g., an electric machine), propulsion source 145, and propulsion source 185. In other examples, vehicle 10 may include more or fewer propulsion sources. In one example, propulsion source 105, propulsion source 145, and propulsion source 185 may be electric machines that operate as a motor or generator. Propulsion source 105 is fastened to the electrified axle 190. Propulsion source 145 provides propulsive effort to right front wheel 102*a*. Propulsion source 185 provides propulsive effort to left front wheel 102*b*. In FIG. 1 mechanical connections between the various components are illustrated as solid lines, whereas electrical connections between various components are illustrated as dashed lines.

Vehicle propulsion system 199 includes an electrified axle 190 (e.g., an axle that includes an integrated electric machine that provides propulsive effort for the vehicle). Electrified axle 190 may include two half shafts, including a first or right haft shaft 190*a* and a second or left half shaft 190*b*. In other examples, the vehicle may include an internal combustion engine as a propulsion source.

The electrified axle 190 may be an integrated axle that includes differential gears 106, gear set 107, and propulsion source 105. Electrified axle 190 may include a first speed sensor 119 for sensing a speed of propulsion source 105, a second speed sensor 122 for sensing a speed of an output shaft (not shown), a first clutch actuator 112, and a clutch position sensor 113. Electric power inverter 115 is electrically coupled to propulsion source 105. An axle control unit 116 is electrically coupled to sensors and actuators of electrified axle 190.

Propulsion source 105 may transfer mechanical power to or receive mechanical power from gear set 107. As such, gear set 107 may be a multi-speed gear set that may shift between gears when commanded via axle control unit 116. Axle control unit 116 includes a processor 116*a* and memory 116*b*. Memory 116*b* may include non-transitory (e.g., read-only memory), random access memory, and keep alive memory. Gear set 107 may transfer mechanical power to or receive mechanical power from differential gears 106. Differential gears 106 may transfer mechanical power to or receive mechanical power from rear wheels 103 via right half shaft 190*a* and left half shaft 190*b*. Propulsion source 105 may consume alternating current (AC) electrical power provided via electric power inverter 115. Alternatively, propulsion source 105*b* may provide AC electrical power to electric power inverter 115. Electric power inverter 115 may be provided with high voltage direct current (DC) power from electric energy storage device 160 (e.g., a traction battery or a traction capacitor). Electric power inverter 115 may convert the DC electrical power from electric energy storage device 160 into AC electrical power for propulsion source 105. Alternatively, electric power inverter 115 may be provided with AC power from propulsion source 105. Electric power inverter 115 may convert the AC electrical power from propulsion source 105 into DC power to store in electric energy storage device 160.

Propulsion source 145 may transfer mechanical power to or receive mechanical power from right front wheel 102*a*. Right wheel control unit 149 includes a processor 149*a* and memory 149*b*. Memory 149*b* may include non-transitory memory, random access memory, and keep alive memory. Propulsion source 145 may consume alternating current (AC) electrical power provided via electric power inverter 146. Alternatively, propulsion source 145 may provide AC electrical power to electric power inverter 146. Electric power inverter 146 may be provided with high voltage direct current (DC) power from electric energy storage device 160 (e.g., a traction battery or a traction capacitor). Electric power inverter 146 may convert the DC electrical power from electric energy storage device 160 into AC electrical power for propulsion source 145. Alternatively, electric power inverter 146 may be provided with AC power from propulsion source 145. Electric power inverter 146 may convert the AC electrical power from propulsion source 145 into DC power to store in electric energy storage device 160. Propulsion source 145 provides propulsive effort to right front wheel 102*a* via cardan joint 147. Cardan joint 147 allows power to be transferred to and from right front wheel 102*a* even when rotation of steering wheel 198 causes steering knuckle 148 to rotate right wheel 102*a*.

Propulsion source 185 may transfer mechanical power to or receive mechanical power from left front wheel 102*b*. Left wheel control unit 189 includes a processor 189*a* and memory 189*b*. Memory 189*b* may include non-transitory memory, random access memory, and keep alive memory. Propulsion source 185 may consume alternating current (AC) electrical power provided via electric power inverter 186. Alternatively, propulsion source 185 may provide AC electrical power to electric power inverter 186. Electric power inverter 186 may be provided with high voltage direct current (DC) power from electric energy storage device 160 (e.g., a traction battery or a traction capacitor). Electric power inverter 186 may convert the DC electrical power from electric energy storage device 160 into AC electrical power for propulsion source 185. Alternatively, electric power inverter 186 may be provided with AC power from propulsion source 185. Electric power inverter 186 may convert the AC electrical power from propulsion source 185 into DC power to store in electric energy storage device 160. Propulsion source 185 provides propulsive effort to left front wheel 102*b* via cardan joint 187. Cardan joint 187 allows power to be transferred to and from left front wheel 102*b* even when rotation of steering wheel 198 causes steering knuckle 188 to rotate left wheel 102*b*.

Electric energy storage device 160 may periodically receive electrical energy from a power source such as a stationary power grid 176 via charging station 177 and charging cable 178. The stationary power grid 176 and the charging station 177 reside external to the vehicle (e.g., not part of the vehicle). As a non-limiting example, vehicle propulsion system 199 may be configured as a plug-in electric vehicle (EV), whereby electrical energy may be supplied to electric energy storage device 160 via the power grid 176. Vehicle 10 includes a receptacle 164 for receiving charge. Receptacle 164 is electrically coupled to electric power converter 165. Electric power converter 165 may convert AC to DC or DC to DC. Electric power converter is in electrical communication with electric energy storage device 160 such that electric energy storage device 160 may receive DC power from electric power converter 165.

Electric energy storage device 160 may include an electric energy storage device controller 139 and an electrical power distribution box 162. Electric energy storage device controller 139 may provide charge balancing between energy storage element (e.g., battery cells) and communication with other vehicle controllers (e.g., vehicle control unit 152).

Vehicle 10 may include a vehicle control unit (VCU) controller 152 that may communicate with electric power inverter 115, electric power inverter 146, electric power inverter 186, axle control unit 116, right wheel control unit 149, left wheel control unit 189, friction or foundation brake controller 170, global positioning system (GPS) 193, and dashboard 130 and components included therein via controller area network (CAN) 120. VCU 152 includes memory 114, which may include non-transitory memory and random access memory (RAM). VCU also includes a digital processor or central processing unit (CPU) 153, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not limited to lateral accelerometers, longitudinal accelerometers, yaw rate sensors, inclinometers, temperature sensors, electric energy storage device voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and brake pedal position sensor 151. Actuators may include but are not limited to inverters, transmission controllers, display devices, human/machine interfaces, friction braking systems, and electric energy storage device controller described herein.

Driver demand pedal position sensor 141 is shown coupled to driver demand pedal 140 for determining a degree of application of driver demand pedal 140 by human 142. Brake pedal position sensor 151 is shown coupled to brake pedal 150 for determining a degree of application of brake pedal 150 by human 142. Steering angle sensor 197 is configured to determine a steering angle according to a position of steering wheel 198.

Vehicle propulsion system 199 is shown with a global position determining system 193 that receives timing and position data from one or more GPS satellites 194. Global positioning system may also include geographical maps in ROM for determining the position of vehicle 10 and features of roads that vehicle 10 may travel on.

Vehicle propulsion system may also include a dashboard 130 that an operator of the vehicle may interact with. Dashboard 130 may include a display system 132 configured to display information to the vehicle operator. Display system 132 may comprise, as a non-limiting example, a touchscreen, or human machine interface (HMI), display which enables the vehicle operator to view graphical information as well as input commands. In some examples, display system 132 may be connected wirelessly to the internet (not shown) via VCU 152. As such, in some examples, the vehicle operator may communicate via display system 132 with an internet site or software application (app) and VCU 152.

Dashboard 130 may further include an operator interface 136 via which the vehicle operator may adjust the operating status of the vehicle. Specifically, the operator interface 136 may be configured to activate and/or deactivate operation of the vehicle driveline (e.g., propulsion components between the propulsion source 105 and wheels 103) based on an operator input. Further, an operator may request an axle mode (e.g., park, reverse, neutral, drive) via the operator interface. Various examples of the operator interface 136 may include interfaces that apply a physical apparatus, such as a key or a nearby phone that may be place proximate to the operator interface 136 to activate the electrified axle 190, propulsion source 105, propulsion source 145, and propulsion source 185 to turn on the vehicle 10. Alternatively, the key or phone may be removed to shut down the electrified axle and propulsion source 105, propulsion source 145, and propulsion source 185 to turn off vehicle 10. Electrified axle 190, propulsion source 105, propulsion source 145, and propulsion source 185 may be activated via supplying electric power to propulsion source 105, propulsion source 145, propulsion source 185, electric power inverter 115, electric power inverter 146, and electric power inverter 186. Electrified axle 190 and electric machine may be deactivated by ceasing to supply electric power to electrified axle 190, propulsion source 105, propulsion source 145, propulsion source 185, electric power inverter 115, electric power inverter 146, and electric power inverter 186. Spatial orientation of vehicle 10 is indicated via axes 175.

Vehicle 10 is also shown with a foundation or friction brake controller 170. Friction brake controller 170 may selectively apply and release friction brakes 172a/172b via allowing hydraulic fluid to flow to friction brakes 172a/172b. Friction brakes 172a/172b may be applied and released so as to avoid locking to front wheels 102 and rear wheels 103. Wheel position or speed sensors 161 may provide wheel speed data to friction brake controller 170. Vehicle propulsion system 199 may provide torque to rear wheels 103 to propel vehicle 10.

A human or autonomous driver may request a driver demand torque, or alternatively a driver demand power, via applying driver demand pedal 140 or via supplying a driver demand wheel torque/power request to vehicle controller 152. Vehicle controller 152 may then demand a torque or power from propulsion source 105, propulsion source 145, and propulsion source 185 via commanding axle control unit 116, front right wheel control unit 149, and front left wheel control unit 189. Axle control unit 116 may command electric power inverter 115 to deliver a portion of the driver demand torque/power via electrified axle 190 and propulsion source 105. Likewise, front right control unit 149 may command electric power inverter 146 to deliver a portion of the driver demand torque/power via front right wheel 102a. Similarly, front left control unit 189 may command electric power inverter 186 to deliver a portion of the driver demand torque/power via front left wheel 102b. Propulsion source 105 rotates and transfers torque/power to gear set 107. Gear set 107 may supply torque from propulsion source 105 to differential gears 106, and differential gears 106 transfer torque from propulsion source 105 to rear wheels 103 via half shafts 190a and 190b.

During conditions when the driver demand pedal is fully released, vehicle controller 152 may request a small negative or regenerative braking power to gradually slow vehicle 10 when a speed of vehicle 10 is greater than a threshold speed. The amount of regenerative braking power requested may be a function of driver demand pedal position, electric energy storage device state of charge (SOC), vehicle speed, and other conditions. If the driver demand pedal 140 is fully released and vehicle speed is less than a threshold speed, vehicle controller 152 may request a small amount of positive torque/power from propulsion source 105, propulsion source 145, and propulsion source 185, which may be referred to as creep torque or power. The creep torque or power may allow vehicle 10 to remain stationary when vehicle 10 is on a positive grade.

The human or autonomous driver may also request a negative or regenerative driver demand braking torque, or alternatively a driver demand braking power, via applying brake pedal 150 or via supplying a driver demand braking power request to vehicle control unit 152. Vehicle controller 152 may request that a first portion of the driver demanded braking power be generated via electrified axle 190, propulsion source 105, propulsion source 145, and propulsion source 185 via commanding axle control unit 116, wheel control unit 149, and wheel control unit 189. Additionally, vehicle controller 152 may request that a portion of the driver demanded braking power be provided via friction brakes 172 via commanding friction brake controller 170 to provide a second portion of the driver requested braking power.

Referring now to FIG. 2, a detailed longitudinal view of a front right wheel driveline assembly is shown. The vehicle's left front wheel drive assembly may be configured similarly.

Electric machine 145 includes a shaft 204 that includes a reference position 206. The reference position 206 may be a keyway, missing spline, or other mechanical marker that indicates a rotational position of shaft 204 relative to electric machine 145. Resolver 202 is an electromagnetic position sensor that provides an indication of the rotational angle 250 (e.g., $\Theta_m$) of shaft 204. The rotational position of reference position 206 corresponds to a sole rotational angle of shaft 204 (e.g., 0 degrees).

Shaft 204 is directly coupled to a first shaft 208 of cardan joint 146. First shaft 208 includes a reference position 210 that may be aligned with the reference position of shaft 204 so that the rotational position of cardan joint 146 may be known relative to the rotational position of shaft 204. First shaft 208 includes a first yoke 212 and first yoke 212 is mechanically coupled to second yoke 214 of cardan joint 147 via cross journal 216. Second yoke 214 is directly coupled to second shaft 218.

Steering knuckle 220 supports cardan joint 147 and wheel hub 226. Steering knuckle 220 allows wheel hub 226 and wheel 102 to pivot, thereby allowing the vehicle to turn right and left. Wheel hub 226 is fastened to steering knuckle 220 and wheel hub 226 includes a bearing (not shown) that allows a second shaft 218 to transmit torque to wheel 102 through wheel hub 226. Wheel hub 226 includes a position encoder 224 that indicates a definite rotational angle 252 (e.g., $\Theta_w$) of wheel hub 226 and wheel 102. Wheel hub 226 is configured to be coupled to second shaft 218 in a single or sole way so that a sole rotational position of wheel hub 226 aligns with a sole rotational position of second shaft 218 and a sole rotational position of shaft. Therefore, the relative position of wheel hub 226 may be determined relative to the rotational position of shaft 204.

Referring now to FIG. 3, an end axial view of a driveshaft and a wheel hub is shown. A drive shaft or second shaft 218 from FIG. 2 includes a reference position 302 (e.g., a missing spline, or another reference position such as a keyway, etc.). Second shaft 218 also includes splines 303 to engage splines 310 of wheel hub 226. However, one spline is missing as indicated at 302 so that second shaft 218 may fit into wheel hub 226 solely one way such that a position of wheel hub 226 is known relative to positions of second shaft 218 and shaft 204. Wheel hub 226 includes a bearing 308 that allows splines 306 to rotate with respect to bearing support 310. Wheel hub 226 also includes a missing spline as indicated at 305 which allows wheel hub 226 to engage and encircle second shaft 218 at a sole rotational position, thereby ensuring correct aligning of second shaft 218 and wheel hub 226 during assembly and retrofitting.

Thus, the system of FIGS. 1-3 provides for a vehicle system, comprising: an electric machine including; a cardan joint coupled to a drive shaft and the electric machine; and a wheel hub including a reference position locating feature that is configured to accept a driveshaft locating feature such that the wheel hub fits over and encircles a cross section of the driveshaft at a sole angular position of the wheel hub, such that the wheel hub fits over and encircles the driveshaft in solely one way. In a first example, the vehicle system further comprises a resolver coupled to the electric machine. In a second example that may include the first example, the vehicle system further comprises a position encoder coupled to the wheel hub. In a third example that may include one or both of the first and second examples, the vehicle system further comprises a controller, the controller including executable instructions stored in non-transitory memory that cause the controller to adjust a torque output of the electric machine. In a fourth example that may include one or more of the first through third examples, the vehicle system includes wherein the torque output of the electric machine is adjusted in response to a difference between an angle of the electric machine and an angle of the wheel hub. In a fifth example that may include one or more of the first through fourth examples, the vehicle system includes wherein the torque output of the electric machine is adjusted in further response to a difference between a rate of angle change of the electric machine (e.g., electric machine rate of angle change) and a rate of angle change of the wheel hub (e.g., wheel hub rate of angle change). In a sixth example that may include one or more of the first through fifth examples, the vehicle system includes wherein the wheel hub is a front wheel hub that is coupled to a steering knuckle.

Referring now to FIG. 4, a method 400 for operating a vehicle driveline or powertrain is shown. The method may be at least partially implemented as executable instructions stored in controller memory in the system of FIGS. 1-3. Further, the method may include actions taken in the physical world to transform an operating state of the system of FIGS. 1-3.

At 402, method 400 fits a resolver to an electric machine and aligns a reference position of a shaft of the electric machine to a reference position of the resolver. For example, an angle of 0° for the electric machine corresponds to an angle of 0° for the resolver. This allows the resolver to indicate the position of the electric machine shaft. Method 400 proceeds to 404.

At 404, method 400 fits a first yoke of a cardan joint to the electric machine aligning a reference position of the first yoke (e.g., a reference position of a shaft that is attached to the first yoke) to a reference position of the shaft of the electric machine. For example, an location of a missing spline of the first yoke assembly is mated to a location of a missing spline on the shaft of the electric machine. This allows the position of the first yoke to be determined via the resolver. Method 400 proceeds to 406.

At 406, method 400 fits a second yoke of the cardan shaft to the first yoke of the cardan shaft. A reference position of the second yoke may be aligned to a reference positon of the first yoke. For example, ends of the first yoke may be positioned at a 90° angle to ends of the second yoke with the cross journal positioned between the ends of the first yoke and the ends of the second yoke. This links the rotational position of the second yoke to the rotational position of the first yoke. Method 400 proceeds to 408.

At 408, method 400 fits the second yoke of the cardan joint to a wheel hub aligning a reference position of the drive shaft from the cardan joint, which may be part of the second yoke of the cardan joint, to a reference position of a wheel hub. For example, rotational angle where a spline is missing on the drive shaft may be aligned with a rotational angle where a spline is missing on the wheel hub. The drive shaft is inserted into the wheel hub. This allows an encoder on the wheel hub to indicate the position of the second yoke or the drive shaft position. Method 400 proceeds to 410.

At 410, method 400 fits an encoder (e.g., an encoder that provides a definite rotational position of a device it is coupled to, such as a wheel hub) to the wheel hub. A reference position of the encoder is aligned with a reference positon of the wheel hub. For example, an angle of 0° for the encoder is aligned to an angle of 0° for the wheel hub. This allows the encoder to indicate the position of the wheel hub. Method 400 proceeds to 412.

At 412, method 400 generates a portion of a driver demand wheel torque and adds compensation to the driver demand wheel torque for cancelling out torque pulsations that may be due to rotation of the cardan joint and a steering angle of the vehicle. For example, a wheel torque command for a wheel may be determined via the following equation:

$$RFT = X \cdot DDWT + k(\Theta_m - \Theta_W) + b(\dot{\Theta}_m - \dot{\Theta}_w)$$

where RFT is the commanded right front wheel torque, X is a multiplier that may be determined via a vehicle stability control algorithm or it may be a predetermined amount (e.g., 0.25), DDWT is driver demand wheel torque as determined from driver demand pedal position, k is a system stiffness constant, $\Theta_m$ is the angle of the electric machine, $\Theta_w$ is the wheel or wheel hub angle, b is system damping constant, $\dot{\Theta}_m$ is the angular rate of change for the electric machine, and $\dot{\Theta}_w$ is the angular rate of change for the wheel or wheel hub. Method 400 commands an electric machine to provide the commanded torque. Method 400 proceeds to exit.

In this way, torque of a driveline may be compensated for rotation of a cardan joint to smooth torque delivery of the driveline. The relative rotational position of a wheel with respect to a rotational position of an electric machine may be determined via a resolver and an encoder knowing that the driveline between the electric machine and the wheel hub fits together in a sole way.

Thus, the method of FIG. 4 provides for a method for operating a driveline, comprising: adjusting a propulsion source torque command in response to a difference between an angle of the propulsion source (e.g., a propulsion source angle) and an angle of a wheel hub (e.g., a wheel hub angle). In a first example, the method includes wherein the propulsion source is an electric machine. In a second example that may include the first example, the method further comprises adjusting the propulsion source torque command in further response to a difference between an angular rate of change of the propulsion source and an angular rate of change of the wheel hub. In a third example that may include one or both of the first and second examples, the method includes wherein the angle of the propulsion source is determined via a resolver. In a fourth example that may include one or both of the first and second examples, the method includes wherein the angle of the wheel hub is determined via an encoder. In a fifth example that may include one or more of the first through fourth examples, the method includes wherein the wheel hub is directly coupled to a steering knuckle. In a sixth example that may include one or more of the first through fifth examples, the method further comprises delivering torque from the propulsion source to the wheel via a cardan joint. In a seventh example that may include one or more of the first through sixth examples, the method includes where the propulsion source supplies torque to a front wheel of a vehicle.

The method of FIG. 4 also provides for a method for operating a driveline, comprising: supplying torque from an electric machine to a wheel hub, wherein the wheel hub is coupled to the electric machine via a cardan joint; and adjusting an electric machine torque command in response to a difference between an angle of the electric machine (e.g., an electric machine angle) and an angle of the wheel hub (e.g., a wheel hub angle). In a first example, the method further comprises adjusting the electric machine torque command in further response to a difference between a rate of angle change of the electric machine and a rate of angle change of the wheel hub. In a second example that may include the first example, the method includes wherein the wheel hub is coupled to a steering knuckle. In a third example that may include one or both of the first and second examples, the method further comprises adjusting the electric machine torque command in response to a driver demand torque. In a fourth example that may include one or more of the first through third examples, the method includes wherein the angle of the wheel hub is determined via an encoder.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing does not have to be maintained to achieve the features and advantages of the example examples described herein. Rather, it is provided for ease of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a driveline, comprising:
   providing a propulsion source torque, proportional to a propulsion source torque command, to drive at least one wheel via a propulsion source to propel a vehicle; and
   adjusting the propulsion source torque command in response to a difference between a propulsion source angle and a wheel hub angle.

2. The method of claim 1, wherein the propulsion source torque command is send to the propulsion source coupled to a gear set, the propulsion source being an electric machine.

3. The method of claim 2, further comprising adjusting the propulsion source torque command in further response to a second difference between a propulsion source angular rate of change and a wheel hub angular rate of change, wherein the gear set is coupled to differential gears.

4. The method of claim 3, wherein the propulsion source angle is determined via a resolver.

5. The method of claim 4, wherein the wheel hub angle is determined via an encoder.

6. The method of claim 1, wherein the wheel hub angle is an angle of a wheel hub that is directly coupled to a steering knuckle.

7. The method of claim 1, further comprising delivering torque from the propulsion source to the at least one wheel via a cardan joint.

8. The method of claim 7, where the propulsion source supplies torque to a front wheel of the vehicle.

9. A vehicle system, comprising:
an electric machine configured to provide a propulsive torque to wheels of the vehicle system to propel a vehicle;
a cardan joint coupled to a driveshaft and the electric machine;
a wheel hub including a reference position locating feature that is configured to accept a driveshaft locating feature such that the wheel hub fits over and encircles a cross section of the driveshaft at a sole angular position of the wheel hub, such that the wheel hub fits over and encircles the driveshaft in solely one way; and
a controller including executable instructions stored in non-transitory memory that cause the controller to adjust a propulsive torque output of the electric machine in response to a difference between an electric machine angle and a wheel hub angle.

10. The vehicle system of claim 9, further comprising a resolver coupled to the electric machine.

11. The vehicle system of claim 10, further comprising a position encoder coupled to the wheel hub.

12. The vehicle system of claim 9, wherein the torque output of the electric machine is adjusted in further response to a second difference between an electric machine rate of angle change and a wheel hub rate of angle change.

13. The vehicle system of claim 9, wherein the wheel hub is a front wheel hub that is coupled to a steering knuckle.

14. A method for operating a driveline, comprising:
supplying torque from an electric machine to a wheel hub, wherein the wheel hub is coupled to the electric machine via a cardan joint, and wherein the electric machine is configured to provide propulsion torque to drive at least one wheel of the driveline; and
adjusting an electric machine torque command in response to a difference between an electric machine angle and a wheel hub angle.

15. The method of claim 14, further comprising adjusting the electric machine torque command in further response to a second difference between an electric machine rate of angle change and a wheel hub rate of angle change.

16. The method of claim 14, wherein the wheel hub is coupled to a steering knuckle.

17. The method of claim 14, further comprising adjusting the electric machine torque command in response to a driver demand torque.

18. The method of claim 14, wherein the wheel hub angle is determined via an encoder.

\* \* \* \* \*